(12) United States Patent
Esser

(10) Patent No.: US 6,494,234 B2
(45) Date of Patent: Dec. 17, 2002

(54) PIPE BEND FOR A PIPELINE FOR TRANSPORT OF ABRASIVE MATERIALS

(75) Inventor: Alexander Esser, Warstein (DE)

(73) Assignee: Esser-Werke GmbH & Co. KG, Warstein (DE)

( * ) Notice: Subject to any disclaimer, the term of this patent is extended or adjusted under 35 U.S.C. 154(b) by 0 days.

(21) Appl. No.: 09/884,865

(22) Filed: Jun. 19, 2001

(65) Prior Publication Data
US 2002/0005222 A1 Jan. 17, 2002

(30) Foreign Application Priority Data

Jul. 1, 2000 (DE) .......................................... 100 32 074
Jul. 29, 2000 (EP) ............................................. 00116455
May 3, 2001 (EP) ............................................. 01110710

(51) Int. Cl.⁷ .............................. F16L 9/04; F16L 43/00
(52) U.S. Cl. ....................... 138/109; 138/177; 138/155; 285/55; 285/179
(58) Field of Search ................................ 138/109, 155, 138/114, 148, 177; 285/55, 179; 406/193

(56) References Cited
U.S. PATENT DOCUMENTS 5,275,440 A * 1/1994 Esser ........................... 138/149
5,379,805 A * 1/1995 Klemm et al. ............... 138/109
5,718,461 A * 2/1998 Esser ........................... 285/179
5,813,437 A * 9/1998 Esser ........................... 138/109
5,971,035 A * 10/1999 Griffioen ...................... 138/109
5,984,374 A * 11/1999 Esser ........................... 285/179
6,145,545 A * 11/2000 Hartnagel et al. ........... 138/109
6,209,319 B1 * 4/2001 Maeda et al. ................ 138/114

* cited by examiner

Primary Examiner—Patrick Brinson
(74) Attorney, Agent, or Firm—Henry M. Feiereisen

(57) ABSTRACT

A pipe bend for a pipeline for transporting abrasive materials, includes a pair of coupling collars having an outer ring, which has an outer circumferential anchoring groove, and an inner ring secured in the outer ring against axial displacement and made of a more wear-resistant material than the outer ring. Extending between the coupling collars is an arcuate outer pipe portion which is welded at both its ends to the outer rings of the coupling collars, and has a greater inner diameter than the outer rings. Extending at a radial distance to the outer pipe portion between the inner rings of the coupling collars is an arcuate inner pipe portion made of more wear-resistant material than the outer pipe portion and having opposite ends of an inner cross section in coaxial alignment to an inner cross section of the inner rings, for radial support upon the outer pipe portion.

28 Claims, 3 Drawing Sheets

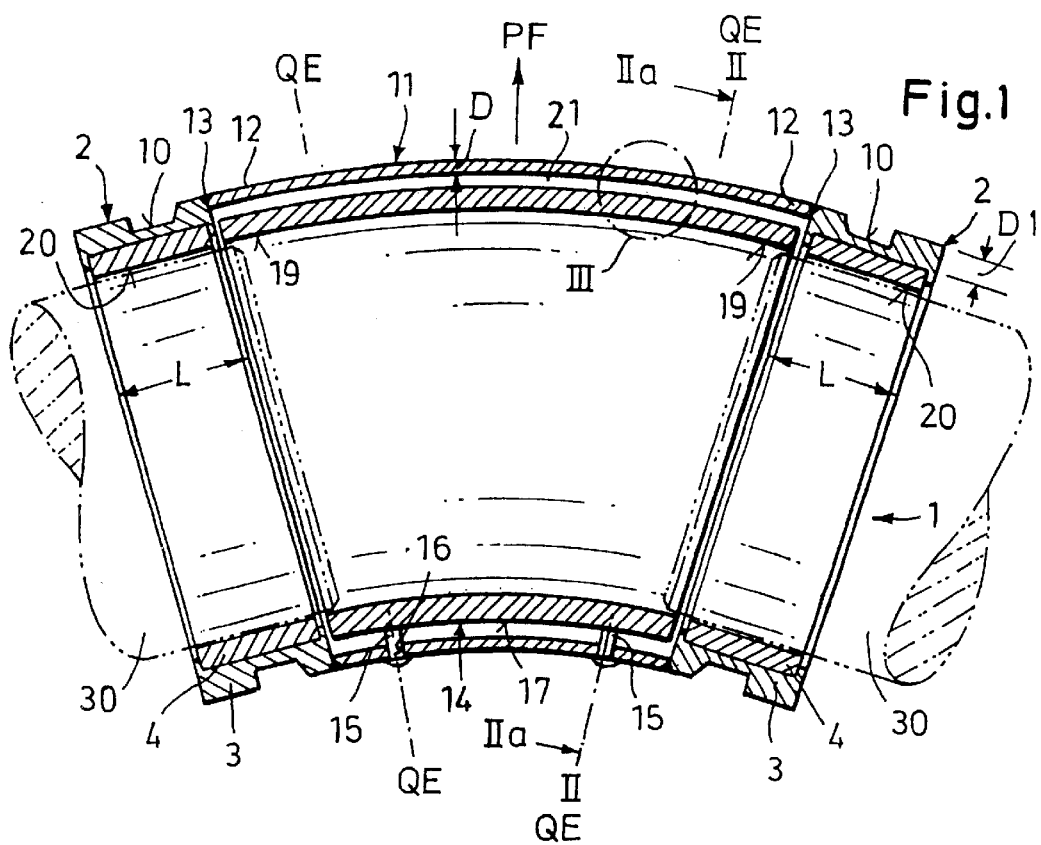
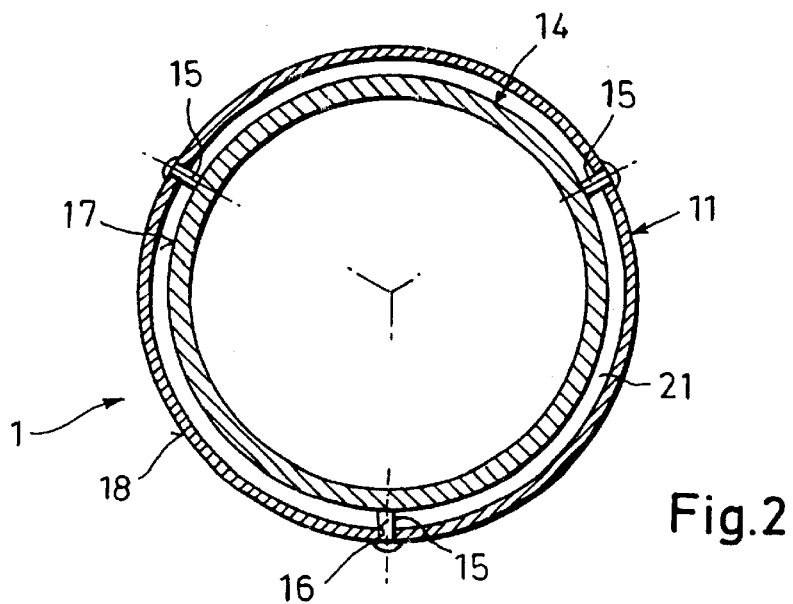

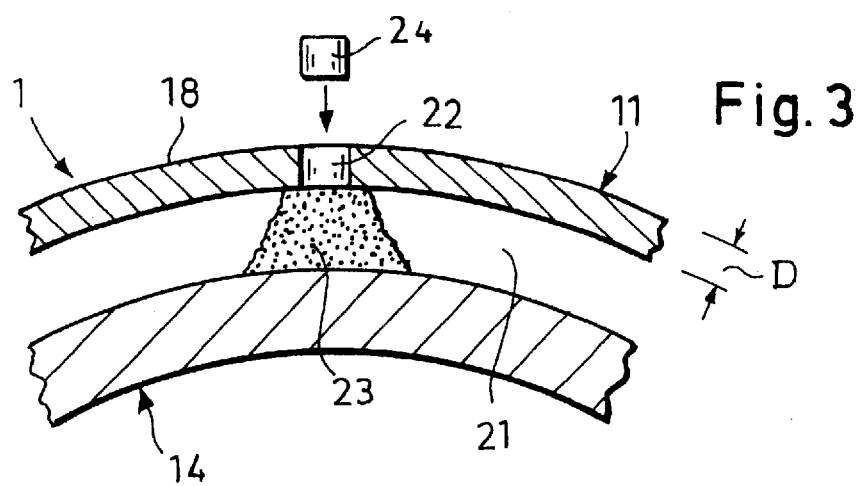
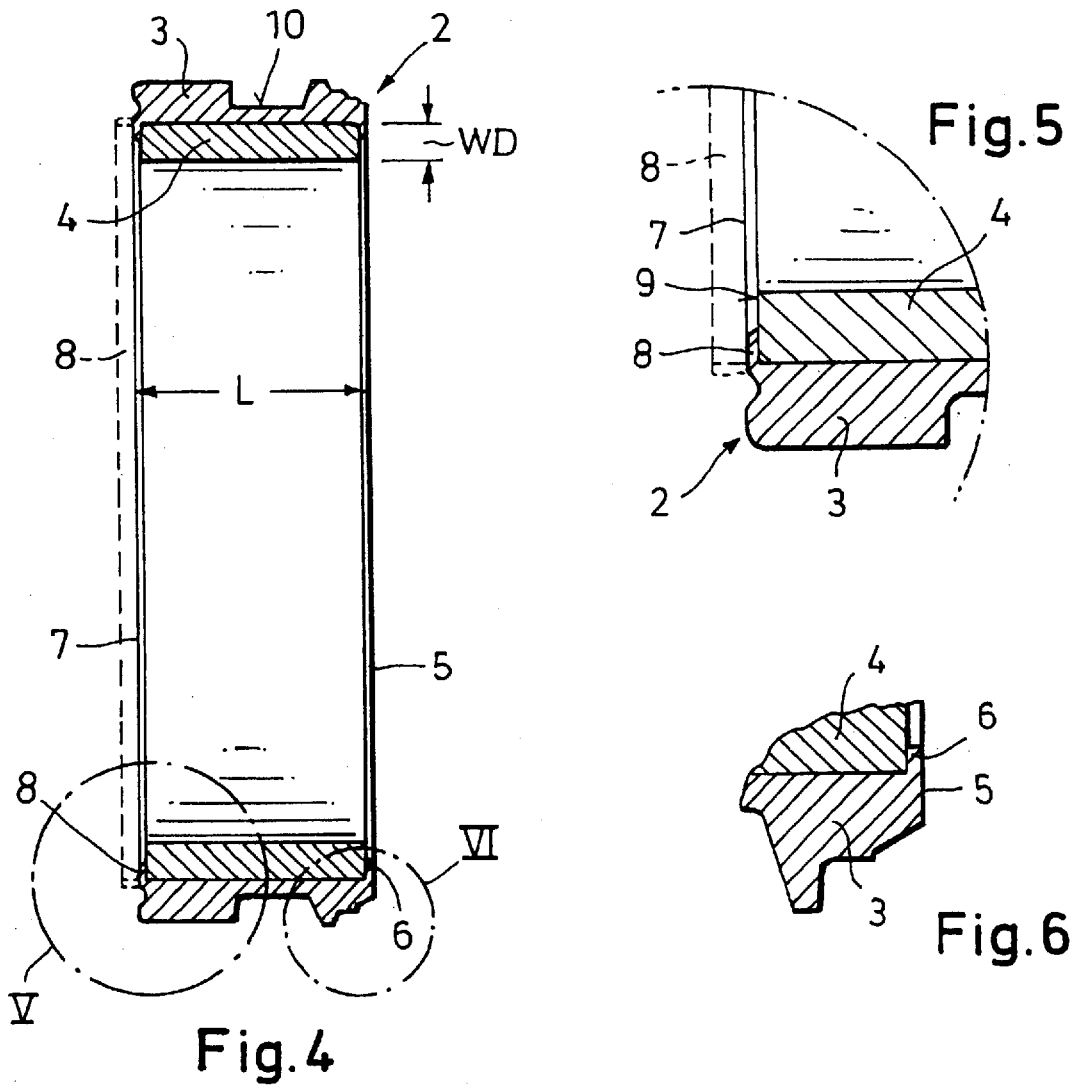

PIPE BEND FOR A PIPELINE FOR TRANSPORT OF ABRASIVE MATERIALS

CROSS-REFERENCES TO RELATED APPLICATIONS

This application claims the priorities of German Patent Application Ser. No. 100 32 074.0, filed Jul. 1, 2000, and European Patent Applications, Ser. No. 00 116 455.7, filed Jul. 29, 2000 and 01 110 710.9, filed May 3, 2001, the subject matter of which is incorporated herein by reference.

BACKGROUND OF THE INVENTION

The present invention relates, in general, to a pipe bend for a pipeline for transport of abrasive materials.

Pipelines, comprised of individual pipe members, such as pipe bends and/or straight pipes, for transport of abrasive materials, such as, e.g. sand or concrete, have to meet high demands. On the one hand, the pipe members and in particular the pipe bends of different curvature, which are incorporated in the pipeline, should have inner surfaces that are highly wear-resistant. On the other hand, the pipe members should be of a material sufficient to withstand impacts and shocks, without crack formations. In other words, the pipe members should have a hard inside surface and a soft outside surface.

In order to reconcile these contradicting requirements, pipe members for pipelines have been configured of two layers. The inner layers are hardened at least over a major part of their radial thickness, while the outer layers are made of weldable steel. In this way, the outer layers could also be connected at their ends with coupling collars for respective attachment of two pipe members. These coupling collars are designed with their end faces at a right angle to the longitudinal axes so that, after removal of a, normally split, coupling clamp, a worn-out pipe member can be withdrawn in radial direction from the pipeline and replaced by a new pipe member, without requiring the pipeline to be pulled apart in axial direction.

So long as straight pipe members are involved, this proposal has proven to be useful. However, when pipe bends are involved, this configuration suffers shortcomings as pipe bends are exposed to much higher wear, when the transported material changes the flow direction.

Conventionally, the terminal coupling collars are each comprised of an outer ring, which is formed with an outer circumferential anchoring groove, and an inner ring, which is surrounded by the inner ring and made of more wear-resistant material than the outer ring. The inner ring is secured against axial displacement solely in the direction toward the end faces of the pipe bends. In view of unavoidable manufacturing tolerances, the internal components of the pipe bends, i.e. inner rings and inner layers, are installed at relative clearance, so that the pressure of the transported material causes a shift of the trailing inner rings, together with the inner layers, in the direction towards the leading inner rings, as viewed in material flow direction. Therefore, the gap already provided between the trailing inner rings and inner layers as a result of manufacturing tolerances, widens further between two successive pipe bends. This significantly adversely affects the service life of the pipe bends with the internal components shifted in flow direction.

In addition, in situations when a worn-out seal between two pipe bends must be replaced, and the installer has to replace the trailing pipe bend, as viewed in material flow direction, the gap between adjacent pipe bends is further widened, when the installer mounts the pipe bend in inverse disposition, because the internal components that have shifted in flow direction are cemented tight in their shifted position by the materials. As a consequence, wear is even greater in the transition area from one pipe bend to the neighboring pipe bend.

It would therefore be desirable and advantageous to provide an improved pipe bend which obviates prior art shortcomings and which exhibits high wear resistance and yet is easy to replace and easy to fabricate.

SUMMARY OF THE INVENTION

According to one aspect of the present invention, a pipe bend for a pipeline for conveying abrasive materials, such as sand or concrete, includes a pair of coupling collars including an outer ring, which has an outer circumferential anchoring groove, and an inner ring mounted in the outer ring and secured therein against displacement in axial direction, wherein the inner ring is made of a material which is more wear-resistant than a material of the outer ring; an arcuate outer pipe portion extending between the coupling collars and having opposite ends welded to the outer ring of the coupling collars, wherein the outer pipe portion has an inner diameter which is greater than an inner diameter of the outer rings of the coupling collars; and an arcuate inner pipe portion extending at a radial distance to the outer pipe portion between the inner rings of the coupling collars and made of a material which is more wear-resistant than a material of the outer pipe portion, wherein the inner pipe portion has opposite ends of an inner cross section which is in coaxial alignment to an inner cross section of the inner rings, for radial support upon the outer pipe portion.

Although being disposed at comparably great distances to the outer pipe portion in radial direction and to the inner rings of the coupling collars in axial direction, the inner pipe portion can still be reliably integrated in the outer pipe portion, despite imprecisions during fabrication, in such a manner that the terminal inner cross sections of the inner pipe portion are disposed in accurate coaxial alignment with respect to the inner rings of the coupling collars. Radial offsets or stepped shoulders between the inner pipe portion and the inner rings, which would be exposed to increased wear and thus would shorten the service life of the pipe bend can be avoided.

Exact alignment of the terminal inner cross sections of the inner pipe portion with the inner cross sections of the inner rings can be realized by inserting centering pins into the coupling collars from the end faces of the pipe bend, and subsequently radially supporting the inner pipe portion against the outer pipe portion. After removing the centering pins, the inner pipe portion is accurately aligned with the inner rings of the coupling collars. In this way, the pipe bend is not heavier than conventional pipe bends but has a much longer service life.

In view of the fact that the inner rings are secured in position in the outer rings of the coupling collars and the inner pipe portion is secured in position in the outer pipe portion, the internal components of a pipe bend according to the present invention can no longer shift as a consequence of exerted pressure by the conveyed material. A pipe bend according to the present invention has not only a higher wear resistance at the ends of the pipe bend, but it is also immaterial whether the pipe bend is installed in 180° rotated disposition after replacement or a change of seals, so that greater gap formation and accompanying increased wear are no longer an issue.

The axial securement of the inner rings in the outer rings of the coupling collars may be realized by mounting the inner ring of each coupling collar to the outer ring between an inwardly directed shoulder at one end of the outer ring and a radially inwards directed constraint at the other end of the outer ring. As the outer ring is welded to the outer pipe portion, the shoulder can be made through a turning process. The respective inner ring is then inserted in the outer ring until abutting the shoulder. The constraint at the other end face may be a radially inwardly directed flange, which extends about the entire circumference, or tabs arranged at predetermined areas and projecting radially inwards, for precisely clamping the inner ring in axial direction.

According to another feature of the present invention, spacers may be provided for securing the inner pipe portion in radial relationship to the outer pipe portion. The spacers may be pins of steel and maintain a required distance of the inner pipe portion from the outer ring in a simple and reliable manner, despite imprecisions during the manufacturing process. The spacers are suitably driven in boreholes of the outer pipe portion so as to be fixed in place and thereby secure a position of the inner pipe portion relative to the outer pipe portion, with the spacers merely abutting the outer surface of the inner pipe portion. Optionally, the spacers may additionally be fixed to the outer pipe portion by a welding process.

According to a variation of the present invention, the inner pipe portion may be secured in radial relationship to the outer pipe portion through spot introduction of a fast curing pasty mass into an annular space between the outer and inner pipe portions via boreholes formed in the outer pipe portion at predetermined locations. In this way, the inner pipe portion is radially secured in place with respect to the outer pipe portion, whereby the annular space between the inner and outer pipe portions is effective, despite imprecisions during the manufacturing process. Examples for the pasty mass include multi-component concrete based on plastic. The mass thus fills the annular space between the inner and outer pipe portions in the area of the boreholes and forms a supporting bridge between the inner and outer pipe portions.

Although it is normally sufficient to fix the inner pipe portion relative to the outer pipe portion in radial direction at predetermined points, it is of course conceivable to inject enough pasty mass via the boreholes to fill, or at least to partially fill, the entire space between the inner and outer pipe portions. Suitably, the boreholes for introduction of pasty mass may be plugged by inserts, made, for example, of steel, which may be secured in the boreholes through a press fit. The length of the inserts may correspond to the wall thickness of the outer pipe portion. Of course, the inserts may be secured in place in the boreholes of the outer pipe portion by other means, e.g. through a welding process.

According to another feature of the present invention, the spacers or the boreholes for introduction of pasty mass are arranged in two axially spaced-apart cross sectional planes at 120° offset relationship in each of the cross sectional planes, thereby realizing a proper positioning of the inner pipe portion with respect to the outer pipe portion. Of course, persons skilled in the art will understand that the spacers or the boreholes may also be arranged in more than two cross sectional planes at circumferential offset relationship which may also be smaller or greater than 120°.

According to another feature of the present invention, the outer ring of each of the coupling collars and the outer pipe portion are made of weldable steel, and the inner ring of each of the coupling collars and the outer pipe portion are made of curable plastics. Examples of cast steel include a chromium carbide based casting material. As cracks caused by stress cannot be avoided, when chromium carbide based casting material is involved, so that inner rings made of such material are very susceptible to fracture, the precise axial securement of the inner rings between the shoulders and the flanges still ensures a full operativeness of the inner rings, even when made of chromium carbide based casting material.

The gap formed between the inner pipe portion, inner rings and outer pipe portion are normally filled quickly during operation by the material being conveyed, so that, in effect, a padding is formed to additionally support the more wear-resistant inner pipe portion with respect to the softer material of the outer pipe portion.

According to another feature of the present invention, the annular space between the outer and inner pipe portions may also be filled with curable plastics. In this way, the inner pipe portion is properly supported already during fabrication of the pipe bend and during transport. In addition, possible material deposits in the annular space are prevented which may cause a deformation of the outer pipe portion, in particular when weight consideration dictate an outer pipe portion of comparably thin wall thickness. Plastic material may be injected in the annular space between the inner and the outer pipe portions via at least one opening which can be subsequently sealed again, for example, through welding, press-fitted pin or welded pin.

BRIEF DESCRIPTION OF THE DRAWING

Other features and advantages of the present invention will be more readily apparent upon reading the following description of preferred exemplified embodiments of the invention with reference to the accompanying drawing, in which:

FIG. 1 is a vertical longitudinal section of a pipe bend according to the present invention;

FIG. 2 is a cross section of the pipe bend, taken along the line II—II and viewed in the direction of arrows IIa;

FIG. 3 is an enlarged sectional view of an area III encircled in FIG. 1 and illustrating a variation of a pipe bend according to the present invention;

FIG. 4 is a vertical longitudinal section, on an enlarged scale, of a coupling collar of the pipe bend of FIG. 1;

FIG. 5 is an enlarged detailed view of an area encircled in FIG. 4 and marked V;

FIG. 6 is an enlarged detailed view of an area encircled V in FIG. 5 and marked VI.

DETAILED DESCRIPTION OF PREFERRED EMBODIMENTS

Figure 7:
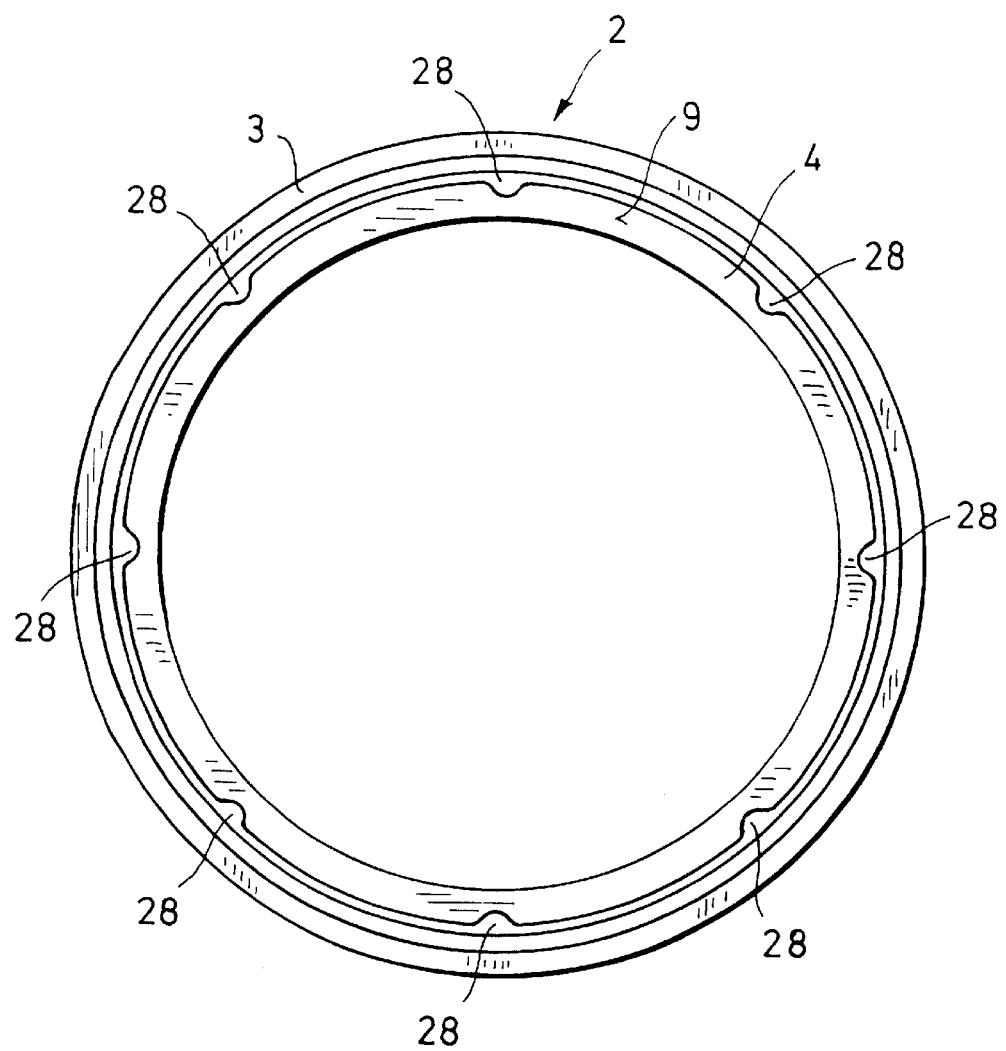
FIG. 7 is a cross section of a modified pipe bend according to the present invention.

Throughout all the Figures, same or corresponding elements are generally indicated by same reference numerals.

Turning now to the drawing, and in particular to FIG. 1, there is shown a vertical longitudinal section of a first embodiment of a pipe bend according to the present invention, generally designated by reference numeral 1 for use in a pipeline for transport of sand or concrete. This type of pipe bend 1 may be integrated in a pipeline comprised of pipe bends and/or straight pipe members, and used e.g., in construction sites for transport of concrete from a mobile or immobile concrete mixer to a job site.

The pipe bend 1 includes two terminal coupling collars 2. As the coupling collars 2 are of an identical construction, it will be understood by persons skilled in the art that a description of one of the coupling collars 2 is equally applicable to the other coupling collar. Each coupling collar 2 is comprised of an outer ring 3 of weldable steel, and an inner ring 4 of cast steel, in particular chromium carbide based casting material. The outer ring 3 is formed with an outer circumferential anchoring groove 10 for attachment of arms, not shown, of cup-shaped coupling clamps, also not shown.

As shown in particular in FIGS. 4 to 7, the inner ring 4 is secured in the outer ring 3 of each coupling collar 2 against axial displacement. Hereby, the outer ring 3 of is formed on one end face with an inwardly directed shoulder 6 (FIG. 6) which extends over a part of the wall thickness WD (FIG. 4) of the inner ring 4. At its other end, the outer ring 3 of each coupling collar 2 is formed with a constraint in the form of circumferentially spaced nose-like tabs 28 (FIG. 7) or in the form of a flange 8, which extends about the entire circumference of the outer ring 3, for abutment against the adjacent end face 9 of the inner ring 4 to thereby push the inner ring 4 against the shoulder 6. Thus, the inner ring 4 of each coupling collar 2 is fixed in place between the shoulder 6 and the tabs 28 or flange 8 and thus cannot be shifted in axial direction, neither in one axial direction nor in the other axial direction. FIGS. 4 and 5 show by way of broken line the material deformation through bending of the flange 8 from a substantially axial disposition to a radial disposition.

As a result of the shoulder 6 and the flange 8 (or tabs 28), the axial length L of the coupling collar 2 on one side of the pipe bend 1 is identical to the axial length L of the coupling collar 2 on the other side of the pipe bend 1. In this way, the pipe bend 1 can be withdrawn in radial direction as indicated by arrow PF and replaced by a new pipe bend inserted in reverse direction, without any problems and without any need to pull the pipeline apart in axial direction.

Referring again to FIG. 1, it can be seen that an outer arcuate pipe portion 11 made of weldable steel is placed between the outer rings 3 of both coupling collars 2. The outer pipe portion 11 is defined by a wall thickness D which is sized smaller than a wall thickness D1 of the outer rings 3 and has opposite ends 12, which are welded by V-welds 13 to the outer rings 3, whereby the outer rings 3 and the outer pipe portion 11 are hereby suitably configured at their confronting ends, as indicated in FIGS. 4 and 6.

Fitted within the outer pipe portion 11 is an inner arcuate pipe portion 14 made of cast steel, in particular chromium carbide based casting material, and extending between the inner rings 4 of the coupling collars 2 at a radial distance to the outer pipe portion 11, thereby confining an annular space 21 therebetween, and at an axial distance to the inner rings 4. These distances exceed imprecisions of all components of the pipe bend 1 during fabrication.

In order to accurately center the inner pipe portion 14 between the inner rings 4 and with respect to the outer pipe portion 11, pin-like spacers 15 of steel are driven through respective boreholes 16 of the outer pipe portion 11 such that the spacers 15 abut the outer surface 17 of the inner pipe portion 14. The spacers 15 are disposed in two cross sectional planes QE which are spaced apart in axial direction, as shown in FIG. 1, whereby the spacers 15 in each cross sectional plane QE are disposed in 120° offset relationship, as shown in FIG. 2. Of course, this configuration is shown by way of example only, and other configurations, which generally follow the concepts outlined here, are considered to be covered by this disclosure. For example, the spacers may be disposed in more than two cross sectional planes, and the angular offset disposition of the spacers in each cross sectional plane may be more or less than 120°. After securing the inner pipe portion 14 in place, the spacers 15 are welded to the outer surface of the outer pipe portion 11.

Assembly of a pipe bend 1 according to the present invention is as follows: After separate fabrication of the coupling collars 2, outer pipe portion 11, inner pipe portion 14 and spacers 15, the inner pipe portion 14 is placed within the outer pipe portion 11 which is then welded at its opposite ends 12 to the outer rings 3 of the coupling collars 2. Subsequently, the inner pipe portion 14 is centered in relation to the inner rings 4 of the coupling collars 2 such that the terminal inner cross sections 19 of the inner pipe portion 14 are in axial alignment with the inner cross sections 20 of the inner rings 4. This is normally done by centering pins 30 movable at the ends into the inner rings 4. After the centering step, which prevents formation of any offsets or steps between the inner pipe portion 14 and the inner rings 4, the spacers 15 are driven through the boreholes 16 in the outer pipe portion 11 until abutting against the outer surface 17 of the inner pipe portion 14. Thereafter, the spacers 15 are secured in place by welding them to the outer surface 18 of the outer pipe portion 11, and the centering pins 30 are removed.

Optionally, the annular space 21 between the inner pipe portion 14 and the outer pipe portion 11 can be filled with a fast-curing plastic material.

Turning now to FIG. 3, there is shown a fragmentary sectional view of another embodiment of a pipe bend according to the present invention. Parts corresponding with those in FIG. 1 are denoted by identical reference numerals and not explained again. In this embodiment, provision is made for the introduction of a fast-curing pasty mass 23, instead of spacers, for implementing a radial securement of the inner pipe portion 14 with respect to the outer pipe portion 11. The pasty mass 23 is injected into the annular space 21 via boreholes 22 of the outer pipe portion 11. An example of the pasty mass 23 is a fast-curing multi-component concrete based on plastic material. Also in this embodiment, the inner pipe portion 14 and the outer pipe portion 11 are radially spaced from one another in predetermined spots.

After injecting the pasty mass 23 into the annular space 21, the boreholes 22 are closed, for example by pin-like inserts 24 of steel. The inserts 24 may have a length, which corresponds to the wall thickness D of the outer pipe portion 11, and may be press-fitted into the boreholes 22. Of course, it is certainly conceivable to additionally weld the inserts 24 to the outer pipe portion 11, for example, by means of a tack seam to the outer surface 18 of the outer pipe portion 11.

While the invention has been illustrated and described as embodied in a pipe bend for a pipeline for transport of abrasive materials, it is not intended to be limited to the details shown since various modifications and structural changes may be made without departing in any way from the spirit of the present invention.

What is claimed as new and desired to be protected by Letters Patent is set forth in the appended claims:

1. A pipe bend for a pipeline for transporting abrasive materials such as sand or concrete, comprising:

a pair of coupling collars including an outer ring, which has an outer circumferential anchoring groove, and an inner ring mounted in the outer ring and secured therein against displacement in axial direction, wherein the inner ring is made of a material which is more wear-resistant than a material of the outer ring;

an arcuate outer pipe portion extending between the coupling collars and having one end, which is welded to the outer ring of one of the coupling collars, and another end which is welded to the outer ring of the other one of the coupling collars, wherein the outer pipe portion has an inner diameter which is greater than an inner diameter of the outer rings of the coupling collars; and an arcuate inner pipe portion extending at a radial distance to the outer pipe portion between the inner ring of one of the coupling collars and the inner ring of the other one of the coupling collars, wherein the inner pipe portion is made of a material which is more wear-resistant than a material of the outer pipe portion, wherein the inner pipe portion has opposite ends of an inner cross section, which is in coaxial alignment to an inner cross section of the inner rings, for radial support upon the outer pipe portion, wherein the inner ring of each coupling collar is mounted to the outer ring between an inwardly directed shoulder at one end of the outer ring and a radially inwards directed constraint at another end of the outer ring.

2. The pipe bend of claim 1, wherein the constraint is a radially inwardly directed flange extending about a circumference of the outer ring.

3. The pipe bend of claim 1, wherein the constraint includes a plurality of tabs extending radially inwardly from a circumference of the outer ring.

4. A pipe bend for a pipeline for transporting abrasive materials such as sand or concrete, comprising:

a pair of coupling collars including an outer ring, which has an outer circumferential anchoring groove, and an inner ring mounted in the outer ring and secured therein against displacement in axial direction, wherein the inner ring is made of a material which is more wear-resistant than a material of the outer ring;

an arcuate outer pipe portion extending between the coupling collars and having one end, which is welded to the outer ring of one of the coupling collars, and another end which is welded to the outer ring of the other one of the coupling collars, wherein the outer pipe portion has an inner diameter which is greater than an inner diameter of the outer rings of the coupling collars;

an arcuate inner pipe portion extending at a radial distance to the outer pipe portion between the inner ring of one of the coupling collars and the inner ring of the other one of the coupling collars, wherein the inner pipe portion is made of a material which is more wear-resistant than a material of the outer pipe portion, wherein the inner pipe portion has opposite ends of an inner cross section, which is in coaxial alignment to an inner cross section of the inner rings, for radial support upon the outer pipe portion; and spacers for securing the inner pipe portion in radial relationship to the outer pipe portion, wherein the spacers are secured by welding to the outer pipe portion.

5. A pipe bend for a pipeline for transporting abrasive materials such as sand or concrete, comprising:

a pair of coupling collars including an outer ring, which has an outer circumferential anchoring groove, and an inner ring mounted in the outer ring and secured therein against displacement in axial direction, wherein the inner ring is made of a material which is more wear-resistant than a material of the outer ring;

an arcuate outer pipe portion extending between the coupling collars and having one end, which is welded to the outer ring of one of the coupling collars, and another end which is welded to the outer ring of the other one of the coupling collars, wherein the outer pipe portion has an inner diameter which is greater than an inner diameter of the outer rings of the coupling collars; and an arcuate inner pipe portion extending at a radial distance to the outer pipe portion between the inner ring of one of the coupling collars and the inner ring of the other one of the coupling collars, wherein the inner pipe portion is made of a material which is more wear-resistant than a material of the outer pipe portion, wherein the inner pipe portion has opposite ends of an inner cross section, which is in coaxial alignment to an inner cross section of the inner rings, for radial support upon the outer pipe portion, wherein the inner pipe portion is secured in radial relationship to the outer pipe portion through spot introduction of a fast curing pasty mass into an annular space between the outer and inner pipe portions via boreholes formed in the outer pipe portion.

6. The pipe bend of claim 5, and further comprising inserts for plugging the boreholes.

7. The pipe bend of claim 6, wherein the inserts are secured to the outer pipe portion through a welding process.

8. A pipe bend for a pipeline for transporting abrasive materials such as sand or concrete, comprising:

a pair of coupling collars including an outer ring, which has an outer circumferential anchoring groove, and an inner ring mounted in the outer ring and secured therein against displacement in axial direction, wherein the inner ring is made of a material which is more wear-resistant than a material of the outer ring;

an arcuate outer pipe portion extending between the coupling collars and having one end, which is welded to the outer ring of one of the coupling collars, and another end which is welded to the outer ring of the other one of the coupling collars, wherein the outer pipe portion has an inner diameter which is greater than an inner diameter of the outer rings of the coupling collars;

an arcuate inner pipe portion extending at a radial distance to the outer pipe portion between the inner ring of one of the coupling collars and the inner ring of the other one of the coupling collars, wherein the inner pipe portion is made of a material which is more wear-resistant than a material of the outer pipe portion, wherein the inner pipe portion has opposite ends of an inner cross section, which is in coaxial alignment to an inner cross section of the inner rings, for radial support upon the outer pipe portion; and spacers for securing the inner pipe portion in radial relationship to the outer pipe portion, wherein the spacers are arranged in at least two axially spaced-apart cross sectional planes at 120° offset relationship in each of the cross sectional planes.

9. The pipe bend of claim 5, wherein the boreholes for introduction of pasty mass are arranged in at least two axially spaced-apart cross sectional planes at 120° offset relationship in each of the cross sectional planes.

10. The pipe bend of claim 1, wherein the outer ring of each of the coupling collars and the outer pipe portion are made of weldable steel, wherein the inner ring of each of the coupling collars and the inner pipe portion are made of cast steel.

11. A pipe bend for a pipeline for transporting abrasive materials such as sand or concrete, comprising:
- a pair of coupling collars including an outer ring, which has an outer circumferential anchoring groove, and an inner ring mounted in the outer ring and secured therein against displacement in axial direction, wherein the inner ring is made of a material which is more wear-resistant than a material of the outer ring;
- an arcuate outer pipe portion extending between the coupling collars and having one end, which is welded to the outer ring of one of the coupling collars, and another end which is welded to the outer ring of the other one of the coupling collars, wherein the outer pipe portion has an inner diameter which is greater than an inner diameter of the outer rings of the coupling collars; and
- an arcuate inner pipe portion extending at a radial distance to the outer pipe portion between the inner ring of one of the coupling collars and the inner ring of the other one of the coupling collars, wherein the inner pipe portion is made of a material which is more wear-resistant than a material of the outer pipe portion, wherein the inner pipe portion has opposite ends of an inner cross section, which is in coaxial alignment to an inner cross section of the inner rings, for radial support upon the outer pipe portion,
- wherein the outer and inner pipe portions confine an annular space therebetween, wherein the annular space is filled with curable plastics.

12. A pipe bend, comprising:
- an inner pipe portion;
- an outer pipe portion surrounding the inner pipe portion at formation of an annular space therebetween;
- a pair of coupling collars, one of the coupling collars welded to one end of the outer pipe portion, and the other one of the coupling collars welded to the other one end of the outer pipe portion, each of the coupling collars including an inner ring and an outer ring in concentric surrounding relation to the inner ring;
- a first constraint for securing the inner ring with respect to the outer ring against a displacement in axial direction; and
- a second constraint for securely fixing the inner pipe portion at a radial distance to the outer pipe portion, wherein the second constraint includes spacers extending through the outer ring and having one end abutting an outer surface of the inner pipe portion.

13. The pipe bend of claim 12, wherein the inner pipe portion is made of a material which is more wear-resistant than a material of the outer pipe portion, and wherein the inner ring is made of a material which is more wearresistant than a material of the outer ring.

14. The pipe bend of claim 12, wherein the outer pipe portion has an inner diameter which is greater than an inner diameter of the outer ring of the coupling collars.

15. A pipe bend, comprising:
- an inner pipe portion;
- an outer pipe portion surrounding the inner pipe portion at formation of an annular space therebetween;
- a pair of coupling collars, one of the coupling collars welded to one end of the outer pipe portion, and the other one of the coupling collars welded to the other one end of the outer pipe portion, each of the coupling collars including an inner ring and an outer ring in concentric surrounding relation to the inner ring;
- a first constraint for securing the inner ring with respect to the outer ring against a displacement in axial direction, wherein the first constraint includes an inwardly directed shoulder at one end of the outer ring and a radially inwards directed flange at another end of the outer ring, said inner ring secured in place between the shoulder and the flange of the outer ring; and
- a second constraint for securely fixing the inner pipe portion at a radial distance to the outer pipe portion.

16. The pipe bend of claim 15, wherein the outer ring has a circumference, said flange extending about the circumference of the outer ring.

17. A pipe bend, comprising:
- an inner pipe portion;
- an outer pipe portion surrounding the inner pipe portion at formation of an annular space therebetween;
- a pair of coupling collars, one of the coupling collars welded to one end of the outer pipe portion, and the other one of the coupling collars welded to the other one end of the outer pipe portion, each of the coupling collars including an inner ring and an outer ring in concentric surrounding relation to the inner ring;
- a first constraint for securing the inner ring with respect to the outer ring against a displacement in axial direction, wherein the first constraint includes an inwardly directed shoulder at one end of the outer ring and a plurality of tabs extending radially inwardly from a circumference of the outer ring, said inner ring secured in place between the shoulder and the tabs of the outer ring; and
- a second constraint for securely fixing the inner pipe portion at a radial distance to the outer pipe portion.

18. The pipe bend of claim 12, wherein the spacers are secured by welding to the outer pipe portion.

19. A pipe bend, comprising:
- an inner pipe portion;
- an outer pipe portion surrounding the inner pipe portion at formation of an annular space therebetween;
- a pair of coupling collars, one of the coupling collars welded to one end of the outer pipe portion, and the other one of the coupling collars welded to the other one end of the outer pipe portion, each of the coupling collars including an inner ring and an outer ring in concentric surrounding relation to the inner ring;
- a first constraint for securing the inner ring with respect to the outer ring against a displacement in axial direction; and
- a second constraint for securely fixing the inner pipe portion at a radial distance to the outer pipe portion, wherein the second constraint is implemented through introduction of a mass into the annular space between the outer and inner pipe portions via boreholes formed in the outer pipe portion.

20. The pipe bend of claim 12, wherein the spacers are arranged in at least two axially spaced-apart cross sectional planes at 120° offset relationship in each of the cross sectional planes.

21. The pipe bend of claim 19, wherein the boreholes for introduction of pasty mass are arranged in at least two axially spaced-apart cross sectional planes at 120° offset relationship in each of the cross sectional planes.

22. The pipe bend of claim 12, wherein the outer ring of each of the coupling collars and the outer pipe portion are made of weldable steel, wherein the inner ring of each of the coupling collars and the inner pipe portion are made of cast steel.

23. A method of installing a pipe bend in a pipeline for transport of abrasive material, comprising the steps of:

placing an inner pipe portion in an outer pipe portion;

welding the outer pipe portion between outer rings of coupling collars; centering the inner pipe portion with respect to inner rings of the coupling collars, thereby coaxially aligning an inner cross section of the inner pipe portion to an inner cross section of the inner rings; and driving spacers through the outer pipe portion until abutting against the inner pipe portion for securing the inner pipe portion in radial relationship to the outer pipe portion.

24. The method of claim 23, and further comprising the step of introducing a plastic mass into an annular space between the inner and outer pipe portions.

25. A method of fabricating a pipe bend for use in a pipeline for transport of abrasive material, comprising the steps of:

pushing an inner ring of a coupling collar against a shoulder on one end of an outer ring of the coupling shoulder;

bending a constraint on an opposite end of the outer ring radially inwards to thereby secure the inner ring within the outer ring against axial displacement;

placing an inner pipe portion in an outer pipe portion;

centering the inner pipe portion with respect to the inner ring of the coupling collar to thereby coaxially align an inner cross section of the inner pipe portion to an inner cross section of the inner ring;

welding an end of an outer pipe portion to the one end of the outer ring; and driving spacers through the outer pipe portion until abutting against the inner pipe portion for securing the inner pipe portion in radial relationship to the outer pipe portion.

26. The method of claim 25, and further comprising the step of introducing a plastic mass into an annular space between the inner and outer pipe portions.

27. The pipe bend of claim 19, wherein the inner pipe portion is made of a material which is more wear-resistant than a material of the outer pipe portion, and wherein the inner ring is made of a material which is more wear-resistant than a material of the outer ring.

28. The pipe bend of claim 19, wherein the outer pipe portion has an inner diameter which is greater than an inner diameter of the outer ring of the coupling collars.

* * * * *